(12) United States Patent
Olson

(10) Patent No.: US 8,833,792 B2
(45) Date of Patent: Sep. 16, 2014

(54) HITCH APPARATUS WITH REDUCED WEAR

(75) Inventor: Brian R. Olson, Fort qu'Appelle (CA)

(73) Assignee: Power Pin Inc., Fort qu'Appelle, Saskatchewan (CA)

( * ) Notice: Subject to any disclaimer, the term of this patent is extended or adjusted under 35 U.S.C. 154(b) by 0 days.

(21) Appl. No.: 13/618,262

(22) Filed: Sep. 14, 2012

(65) Prior Publication Data

US 2013/0175788 A1    Jul. 11, 2013

(30) Foreign Application Priority Data

Jan. 5, 2012   (CA) .................................. 2763045
Apr. 27, 2012  (CA) .................................. 2776026

(51) Int. Cl.
*B60D 1/06*   (2006.01)
*B60D 1/02*   (2006.01)

(52) U.S. Cl.
CPC ... *B60D 1/02* (2013.01); *B60D 1/06* (2013.01)
USPC .......................... 280/511; 280/504; 280/515

(58) Field of Classification Search
CPC .................................... B60D 1/02; B60D 1/06
USPC .......................... 280/511, 513, 515
See application file for complete search history.

(56) References Cited

U.S. PATENT DOCUMENTS

| 3,796,444    | A  * | 3/1974 | Hixon ........................... 280/483 |
| 7,871,108    | B2 * | 1/2011 | Weibling et al. ............... 280/781 |
| 2005/0082788 | A1 * | 4/2005 | Lippons ........................ 280/511 |

OTHER PUBLICATIONS

Correlation of Yield Strength and Tensile Strength with Hardness for Steels, E.J. Pavlina and C.J. Van Tyne Journal of Materials Engineering and Performance (Abstract).*
Admitted Prior Art, Print out from http://www.boomersprayparts.com/bull-pull-hitch.html Accessed Aug. 1, 2012.

* cited by examiner

*Primary Examiner* — Joseph M Rocca
*Assistant Examiner* — Jacob Knutson
(74) *Attorney, Agent, or Firm* — King & Schickli, PLLC

(57) ABSTRACT

An implement hitch tongue apparatus has a nodular cast iron tongue member defining a vertical drawpin hole. A bottom recess is defined in a bottom surface of the tongue member forward of the drawpin hole, and a pin hole recess is defined in a front portion of the drawpin hole. The recesses are filled with hard surfacing welding electrode material by welding with a hard surfacing welding electrode. A grease conduit can provide grease to the bottom surface of the tongue member. A solid one-piece ball insert member can be removably installed in the drawpin hole instead of hard surfacing. The ball insert can provide different drawpin hole sizes, and can extend down below the tongue to support the tongue weight on the ball insert with the ball insert rotating with respect to the tongue during turns.

15 Claims, 4 Drawing Sheets

HITCH APPARATUS WITH REDUCED WEAR

This invention is in the field of agricultural implements and in particular a hitch assembly for attaching an implement to a towing tractor.

BACKGROUND

An agricultural implement is typically connected to a tractor drawbar by a clevis and tongue connection. The clevis provides upper and lower clevis members each defining a drawpin hole, and the tongue defines a drawpin hole and is inserted between the clevis members to align the drawpin holes such that a drawpin can be inserted through them and thereby connect the clevis and tongue.

The clevis may be mounted to the tractor drawbar and the tongue provided by the implement hitch, or vice versa. In either event, the tractor drawbar supports the weight of the front end of the implement being towed, which can be considerable. Thus the tongue of the implement hitch must be connected to the drawbar so that the implement tongue rests on the drawbar. Thus where a hammer strap to form the clevis is mounted to the tractor drawbar, the hammer strap is above the drawbar and the implement hitch tongue rests on the drawbar, and where the hammer strap is mounted to the implement hitch tongue, the hammer strap is under the implement hitch tongue, and again the implement hitch tongue rests on the drawbar.

A predominant area of wear on an implement hitch tongue is the front surface of the drawpin hole. It is this surface against which the drawpin bears when exerting the draft force necessary to pull the implement in the operating travel direction, and thus where full load is placed on the drawpin. Also the bottom of the implement hitch tongue rests on the tractor drawbar, often with considerable downward force. As the tractor and implement turn and pivot about the vertical drawpin, the bottom surface of the implement hitch tongue wears against the top surface of the tractor drawbar, and the drawpin wears against the front surface of the drawpin hole. As tractor and implement widths have increased, draft forces necessary to pull the implement, and in many cases tongue weight as well, have increased significantly, with a corresponding increase in hitch wear. With some implements, such as tub grinders, bale processors, grain carts and the like, while the draft forces are not excessive, tongue weight is significant and in operation the tractor and implement are constantly turning, such that wear on the bottom weight bearing surface of the tongue is pronounced.

Tractors come in a wide variety of sizes, and the drawpin hole in the drawbar of each is typically sized for a pin of sufficient strength to match the power of the tractor. Implements also come in a wide variety of sizes, and similarly have a implement hitch tongue with a drawpin hole that is sized for a pin of sufficient strength to match the power requirement of the implement. It is desirable to have the drawpin holes all the same size so that a corresponding size of drawpin can be inserted to connect the clevis and tongue in the preferred manner such that there is only minimal movement at the connection. Agricultural implement hitches are categorized by size, with a Category 3 hitch using a drawpin with a diameter of 1.50 inches and Category 4 using a drawpin with a diameter of 2.00 inches. As the diameter of the drawpin increases, the bearing surface that carries the draft force pulling the implement also increases, reducing wear. Recently Category 5 hitches have been introduced using a pin with a diameter of 2.75 inches to address the problem of increased wear in agricultural implements.

Implement hitch tongues are typically made from ductile or nodular cast iron, which is inexpensive and resists cracking, as opposed to more wear resistant materials which are brittle. It is known to temper these cast iron implement hitch tongues to resist this wear, and prolong their useful life, however such tempering significantly increases the cost of the implement hitch tongues. Similarly for increased wear resistance, implement hitch tongues can be made from cast steel, however this also significantly increases the cost.

A device called the Bull-Pull Hitch™ is available from Jenner Sales Corp. of Harristown, Ill. that addresses the wear problem by providing a bushing assembly in a hitch hole through the hitch tongue, where the required pivoting motion of the tractor drawbar and implement hitch about the vertical drawpin takes place in the bushing assembly, and not between the hitch tongue, drawbar, and drawpin as in conventional hitches.

The bushing assembly includes an outer ring with an outside surface that corresponds to a segment of a sphere, and an inner bushing that is held in the outer ring by a snap ring. The hitch hole has an inner surface that is a segment of a sphere that corresponds to the outside surface of the outer ring and opposing slots that allow the outer ring to be oriented on edge, dropped down through the slots so that the center of the spherical outside surface coincides with the center of the sphere segment on the inner surface of the hitch hole. The outer ring is then rotated 90 degrees so the outer ring is held in the hitch hole, with upper and lower edges thereof between the upper and lower surfaces of the hitch tongue substantially in the same manner as is known in the art for installing the outer race of a bearing in a bearing block.

Once the outer ring is installed, the inner bushing is inserted inside the outer ring and fastened in place with a snap ring. The top of the bushing is substantially level with the top surface of the hitch tongue, and the bottom of the bushing extends down below the bottom surface of the hitch tongue, such that the bottom annular surface of the bushing bears against the top of the tractor drawbar when the hitch tongue is connected to the drawbar with a drawpin, and the bottom surface of the hitch tongue is somewhat above the drawbar. The tongue weight thus bears down on the bottom annular surface of the bushing and creates substantial friction between the bushing and the drawbar, such that the bushing is held substantially stationary with respect to the drawbar, such that when the tractor makes a turn, the bushing assembly turns in the hitch hole. Thus there is no relative motion between the bushing and the drawbar, and so no wear takes place there.

The device is used with a clevis formed by a hammer strap on the tractor drawbar, so the drawpin is also substantially stationary with respect to the drawbar, and no wear takes place on the drawpin. A grease fitting supplies grease to the bushing assembly and reduces wear in the bushing assembly and the hitch hole.

SUMMARY OF THE INVENTION

It is an object of the present invention to provide a hitch tongue member that overcomes problems in the prior art.

In a first embodiment the present invention provides an implement hitch tongue apparatus adapted at a rear end thereof for attachment to an implement to be towed in an operating travel direction. The apparatus comprises a nodular cast iron tongue member defining a drawpin hole extending substantially vertically therethrough. A bottom recess is defined in a bottom surface of the tongue member forward of the drawpin hole, and a pin hole recess is defined in a front portion of the drawpin hole between a top surface of the tongue member and the bottom surface thereof. The bottom recess and the pin hole recess are substantially filled with hard surfacing welding electrode material by welding with a hard surfacing welding electrode.

The invention significantly reduces wear on the drawpin hole and bottom surface of the tongue member of a hitch assembly at a reasonable cost. The tongue member of the invention can be made harder than the drawpin, such that the relatively inexpensive and easily replaceable drawpin wears out faster than the tongue member.

In a second embodiment the present invention provides a hitch tongue apparatus comprising a tongue member defining an insert hole extending substantially vertically therethrough, the insert hole having a spherical inner surface segment between top and bottom surfaces of the tongue member that has a shape of a segment of a sphere. First and second slots extend along opposite edges of the insert hole from one of the top and bottom surfaces of the tongue member to a mid point of the spherical inner surface segment. A solid pin hole ball insert member defines a drawpin hole therethrough, and has a spherical outer surface configured to correspond to the spherical inner surface segment of the insert hole. The ball insert member is removably installed in the insert hole such that the drawpin hole is substantially vertical.

The ball insert member can be changed easily to provide a variety of drawpin hole diameters. Also the ball insert member can be configured to extend below the lower surface of the tongue member such that the weight on the tongue member is carried on the bottom surface of the ball insert member and not on the bottom surface of the tongue member, thus preventing wear between the to bottom surface of the tongue member and the top surface of the drawbar. Instead the ball insert member rotates in the insert hole during turns. The solid offset ball insert member provides a more simple and cost effective alternative to the prior art.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
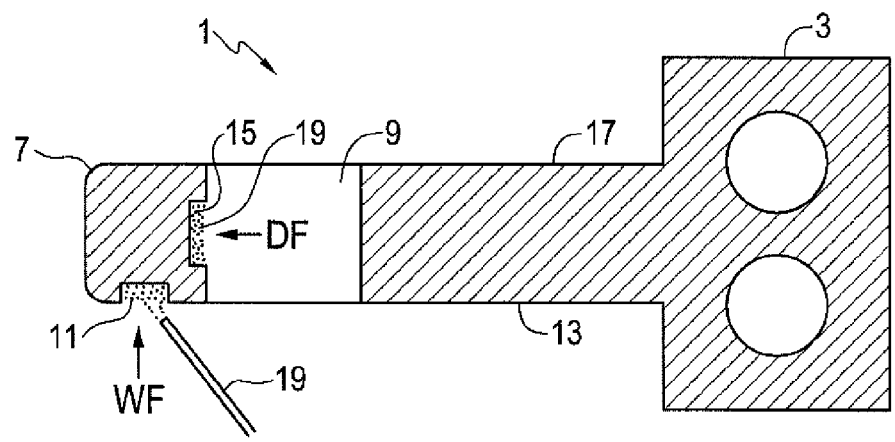
FIG. 1 is a schematic sectional side view of an embodiment of an implement hitch tongue apparatus of the present invention.
Figure 2:
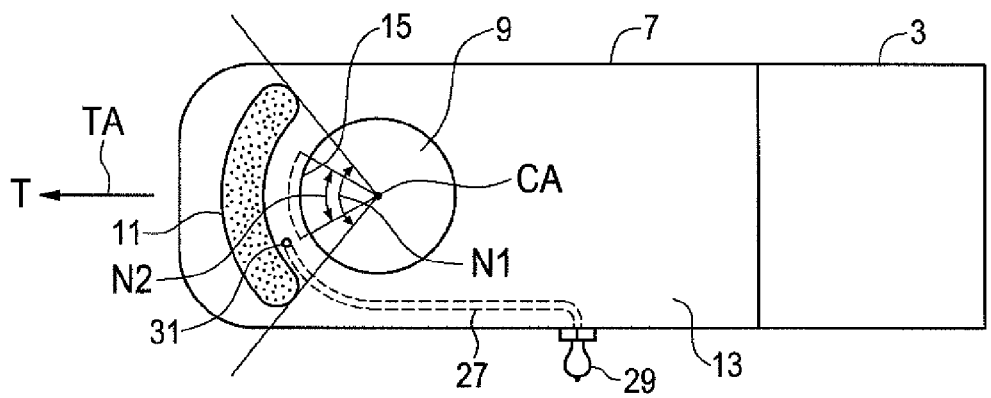
FIG. 2 is a schematic bottom view of the embodiment of FIG. 1.
Figure 3:
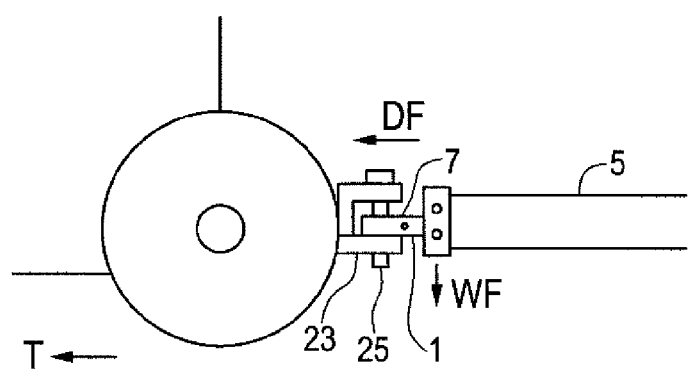
FIG. 3 is a schematic side view of the embodiment of FIG. 1 attached to an implement at the rear end thereof and connected to a tractor drawbar to tow the implement with the tractor.

FIGS. 1-3 schematically illustrate an embodiment of an implement hitch tongue apparatus 1 of the present invention. The apparatus 1 is adapted at a rear end 3 thereof for attachment to an implement 5 to be towed in an operating travel direction T. The apparatus 1 comprises a cast iron tongue member 7 defining a drawpin hole 9 extending vertically therethrough. Such a nodular cast iron tongue member 7 is well known in the hitch art, and is favored because it is not brittle but is rather somewhat elastic, and also has a relatively low cost.

A major drawback with nodular cast iron is that it is relatively soft, with a Rockwell Scale hardness of about HRC 21, and so it can wear excessively, especially where forces exerted thereon are large, and where there is considerable movement, such as when the operation requires frequent turning. It is known to austemper such tongue members, which can increase the hardness to about HRC 43 however tempering significantly increases the cost of the apparatus 1.

The present invention provides a bottom recess 11 defined in a bottom surface 13 of the tongue member 7, and a pin hole recess 15 defined in a front portion of the drawpin hole 9 between the top surface 17 of the tongue member 7 and the bottom surface 13 thereof. The bottom recess 11 and the pin hole recess 15 are filled with hard surfacing welding electrode material 19 by welding with a hard surfacing welding electrode 19 which deposits the electrode material into the recesses 11, 15.

The electrode material has a Rockwell Scale hardness of about HRC 62, much harder than both the regular nodular cast iron at HRC 21 and the tempered nodular cast iron at HRC 43. While welding is generally speaking not an acceptable method of actually joining pieces to cast iron, in the present invention the recesses 11, 15 provide a receptacle for the molten electrode material 19, which simply needs to stick in the recesses. The configuration of the recesses 11, 15 is also such that the forces exerted on the electrode material 19 push the material into the recesses. Weight force WF is exerted on the material 19 in the bottom recess 11 by the tongue member 7 resting on the tractor drawbar 23, as seen in FIG. 3. Draft force DF is exerted on the material 19 in the pin hole recess 15 by the drawpin 25 pushing against the front area of the drawpin hole 9 to tow the implement 5 in the operating travel direction T, also as seen in FIG. 3. Thus the adhesion between the electrode material 19 and the nodular cast iron of the tongue member 7 is not required to resist forces that would tend to pull the electrode material 19 out of the recesses 11, 15.

While the depth of the recesses 11, 15 can vary, it is contemplated that on a Category 3, 4, or 5 hitch, a satisfactory result can be obtained where the bottom and pin hole recesses 11, 15 have a depth of about 0.125 inches to about 0.250 inches.

In the illustrated apparatus 1, the bottom recess 11 forms an arc N1 with a center AC substantially at a center of the drawpin hole 9, and extending substantially equally on each side of an axis TA of the tongue member 7 aligned with the operating travel direction T. Although it could be much longer if desired, it is contemplated that a degree of arc greater than about 90 degrees will satisfactorily reduce wear on the bottom surface of the tongue member 7 caused by friction with the top surface of the drawbar 23. It is also contemplated that the width of the bottom recess 11 will be selected to be about 50% of the bearing width of the bottom surface 13 of the tongue member 7 forward of the drawpin hole 9.

Similarly the pin hole recess 15 forms an arc N2 with a center substantially at a center CA of the drawpin hole, and extending substantially equally on each side of the axis TA. Again although it could be much larger if desired, it is contemplated that a degree of arc greater than about 50 degrees will satisfactorily reduce wear on the inner front surface of drawpin hole 9 caused by friction with the drawpin 25. The pin hole recess 15 extends about equally upward and downward from about a mid-point of a depth of the drawpin hole 7. It is contemplated that the recess could extend from the bottom surface 13 to the top surface 17, but it is contemplated that satisfactory results will be obtained wear the distance from a top edge of the pin hole recess 15 to a bottom edge thereof is about one half the thickness of the tongue member 7. Such a length should provide a large enough bearing surface to avoid excessive wear on a sort length of the drawpin 25.

The electrode material 19 will also typically have a rough surface that, due to the hardness of the material 19, is resistant to machining smooth. The surface however will smooth with use and function satisfactorily. The drawpin 25 may be marked or grooved somewhat by the harder ridges in the surface of the electrode material 19, but this should not be problematic.

Wear on the bottom surface 13 of the tongue member 7, and also on the top surface of the drawbar 23, can further be reduced by periodically applying grease between the surfaces. FIG. 2 shows a grease conduit 27 defined in the tongue member 7 and connected at an input end thereof to a grease fitting 29 and having an output end 31 oriented to deposit grease at a location on the bottom surface 13 of the tongue member 7, generally forward of the drawpin hole 9. Greasing the surfaces will reduce friction and wear on each surface.

In the illustrated apparatus 1, the electrode material has a Rockwell Scale hardness of about HRC 62. The drawpin 25 will typically have a hardness of about HRC 53. Beneficially then the drawpin has a Rockwell hardness less than that of the hard surfacing welding electrode material 19 in the pin hole recess 15, such that the relatively inexpensive drawpin 25 will wear before the pin hole recess wears, and then the drawpin 25 can simply be replaced when such wear exceeds an acceptable wear amount.

The present invention provides a method of reducing wear in a nodular cast iron tongue member 7 of an implement hitch tongue apparatus 1 that is adapted at a rear end 3 thereof for attachment to an implement 5 to be towed in an operating travel direction T. The tongue member 7 defines a drawpin hole 9 extending substantially vertically therethrough, and the method comprises forming the tongue member 7 with a bottom recess 11 in a bottom surface 13 thereof forward of the drawpin hole 9, and with a pin hole recess 15 in a front portion of the drawpin hole 9 between the top surface 17 of the tongue member 7 and the bottom surface 13 thereof, and filling the bottom recess 11 and the pin hole recess 15 with hard surfacing welding electrode material 19 by welding with a hard surfacing welding electrode 19.

The method can further comprise defining a grease conduit 27 in the tongue member 7 with a grease fitting 29 at the input end of the grease conduit, and an output end 31 of the grease conduit 27 oriented to deposit grease at a location on the bottom surface 13 of the tongue member 7, beneficially forward of the drawpin hole 9, where the maximum wear occurs. The rear end 3 of the implement hitch tongue apparatus 1 is attached to the implement 5 to be towed, and the tongue member is connected to a tractor drawbar 23 such that the bottom surface 13 of the tongue member 7 rests on a top surface of the tractor drawbar 23, and periodically directing grease into the grease fitting 29 to deposit grease between the top surface of the tractor drawbar 23 and the bottom surface 13 of the tongue member 7.

The invention significantly reduces wear on the drawpin hole and bottom surface of the tongue member of a hitch assembly at a reasonable cost.

Figure 4:
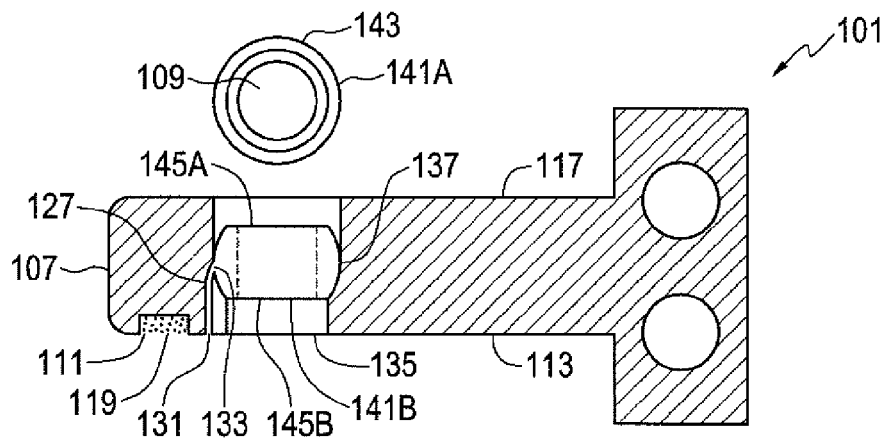
FIG. 4 is a schematic sectional side view of a different embodiment of an implement hitch tongue apparatus of the present invention.
Figure 5:
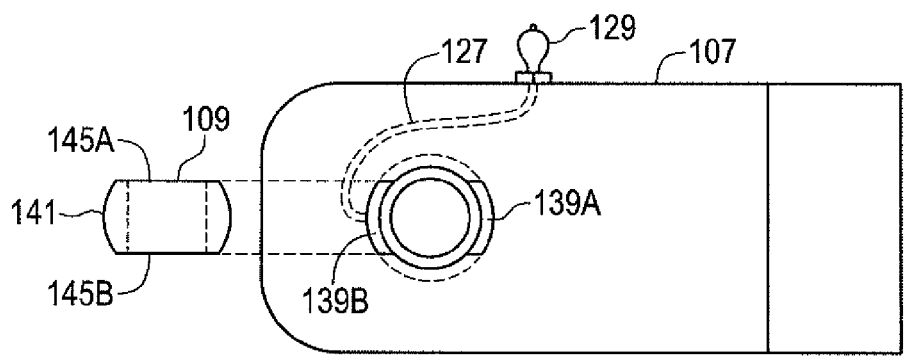
FIG. 5 is a schematic top view of the embodiment of FIG. 4.
Figure 6:
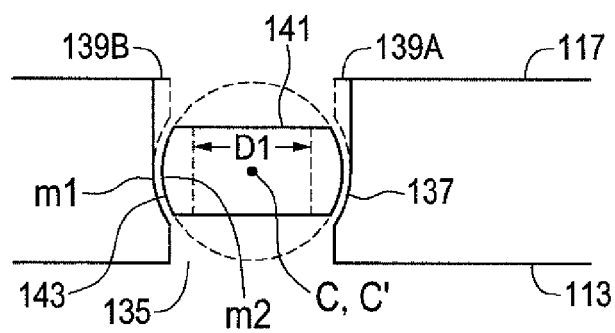
FIG. 6 is a schematic sectional front end view of the embodiment of FIG. 4.

FIGS. 4-6 schematically illustrate an alternate hitch tongue apparatus 101 comprising a tongue member 107 defining a substantially circular insert hole 135 extending substantially vertically therethrough. The insert hole 135 has a spherical inner surface segment 137 between top and bottom surfaces 117, 113 of the tongue member 107. The spherical inner surface segment 137 has the shape of a segment of a sphere.

First and second slots 139A, 139B extend along opposite edges of the insert hole 135 from the top surface 117 of the tongue member 107 to a mid point M1 of the spherical inner surface segment 137.

A hardened ball insert member 141 defines a drawpin hole 109 therethrough, and has a spherical outer surface 143 configured to correspond to the spherical inner surface segment 137 of the insert hole 135. The ball insert member 141 is removably installed in the insert hole 135 such that the drawpin hole 109 is substantially vertical. In the illustrated embodiment the ball insert member 141 is removably installed in the insert hole 135 by orienting the ball insert member 141 such that top and bottom surfaces 145A, 145B of the ball insert member 141 are within the first and second slots 139A, 139B, as schematically illustrated in FIG. 4, moving the ball insert member 141 down along the slots 139A, 139B until a mid point M2 of the ball insert member 141 is substantially at the midpoint M1 of the spherical inner surface segment 137 of the insert hole 135.

At this point the center C of the sphere corresponding to the outer surface 143 of the ball insert member 141 coincides with the center C' of the sphere corresponding to the spherical inner surface segment 137 of the insert hole 135 such that the ball insert member 141 can be rotated in the insert hole 135. The ball insert member 141 is then rotated about 90 degrees as shown in FIG. 4 from the orientation 141A to the orientation 141B with the outer surface 143 of the ball insert member 141 sliding along the spherical inner surface segment 137 of the insert hole 135.

Once rotated to the orientation 141B, the spherical outer surface 143 of the ball insert member 141 is in close sliding proximity to the corresponding spherical inner surface segment 137 of the insert hole 135, and the ball insert member 141 is prevented from moving upward out of the insert hole 135 by the upper portions of the spherical portion of insert hole 135 that are between the slots 139A, 139B.

Those skilled in the art will recognize that the configuration of the ball insert member 141 and insert hole 135 and the installation of the ball insert member 141 are the same as commonly used to install an insert bearing into a pillow block bearing support.

The ball insert member 141, or at least the inner surface thereof, has a Rockwell Scale hardness greater than that of the inner surface of the insert hole 135. Typically the ball insert member can have a Rockwell Scale hardness of greater than about HRC 58, while the inner surface of the insert hole 135 will have a Rockwell Scale hardness of about HRC 21 where the tongue member 7 is made from nodular cast iron. The drawpin hole 109 is defined in the ball insert member 141, and thus is relatively hard compared to the tongue member 107. The ball insert member 141 remains substantially stationary with respect to the spherical inner surface segment 137 of the insert hole 135, and during towing operations the drawpin will turn and move with respect to the hard surface of the drawpin hole 109 and wear will thus be on the hard material of the ball insert member 141 and not on the softer material of the tongue member 107. Wear is thus considerably reduced compared to a conventional tongue member without the insert 141.

Also as described above, a typical drawpin inserted through the drawpin hole 109 will have a Rockwell Scale hardness less than that of at least the inner surface of the insert hole 109, such that the drawpin will wear more than the ball insert member 141.

Figure 7:
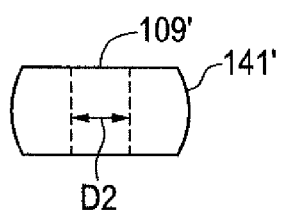
FIG. 7 is a schematic side view of a pin hole ball insert member for use with the embodiment of FIG. 4 where the drawpin hole has a different diameter.

The apparatus 101 provides a further benefit in that ball insert members 141 with the same outer surface 143 can be provided with different drawpin sizes. For example while FIGS. 4-6 schematically illustrate a first ball insert member 141 that defines a first drawpin hole 109 with a first diameter D1, FIG. 7 schematically illustrates a second ball insert member 141' that defines a second drawpin hole 109' with a second diameter D2 that is smaller than the first diameter D1. Thus larger or smaller drawpins can be accommodated simply by removing one ball insert member and installing another.

An insert arrangement such as described could be used where the tongue member 107 is attached to the implement, or where the tongue member 107 is the drawbar of a tractor. Either such hitch member could benefit from the ability to reduce wear and also accommodate different drawpin diameters.

Wear on the bottom of the tongue member 107 can be reduced by providing a bottom recess 111 defined in a bottom surface of the tongue member 107 and filled with hard surfacing welding electrode material 119 by welding with a hard surfacing welding electrode as described above.

Also as described above, a grease conduit 127 can be defined in the tongue member 107 and connected at an input end thereof to a grease fitting 129 and having an output end 131 oriented to deposit grease at a location on the bottom surface 113 of the tongue member 107. To facilitate installation and removal of the ball insert member 141, the grease conduit 127 can also have an opening 133 on the spherical inner surface segment 137 of the insert hole 135 to lubricate the outer surface 143 of the ball insert member 141 and the spherical inner surface segment 137 of the insert hole 135.

The hardened ball insert member 141 significantly reduces wear on the drawpin hole 109 of the tongue member 7 of a hitch assembly at a reasonable cost, and also can be used to provide drawpin holes 109 with different diameters.

Figure 8:
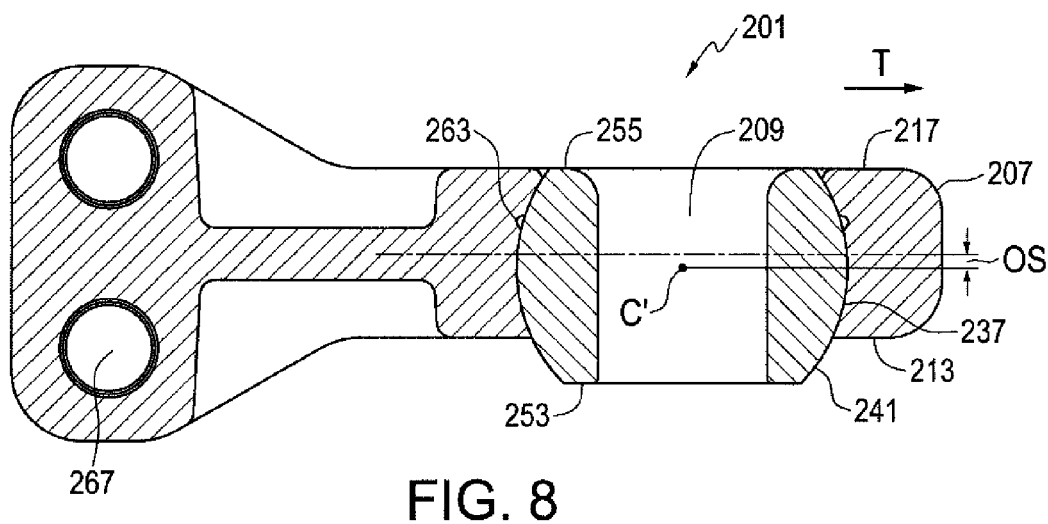
FIG. 8 is a sectional side view of another different embodiment of an implement hitch tongue apparatus of the present invention similar to the embodiment of FIG. 4 but where the ball insert member extends below the lower surface of the tongue member and supports the weight carried on the tongue member.
Figure 9:
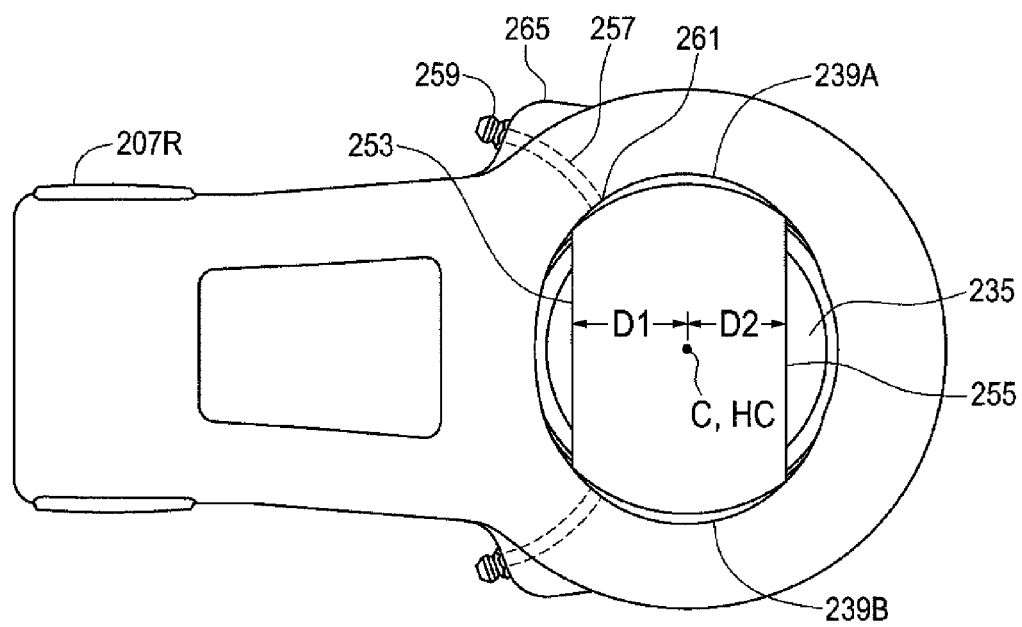
FIG. 9 is a top view of the embodiment of FIG. 8.

FIGS. 8 and 9 illustrate an alternate hitch tongue apparatus 201. The tongue member 207 defines a substantially circular insert hole 235 extending substantially vertically therethrough. As in apparatus 101 described above, the insert hole 235 has a spherical inner surface segment 237 between top and bottom surfaces 217, 213 of the tongue member 207 that has the shape of a segment of a sphere. The tongue member 207 has a tongue center line TC that is located equidistant from top and bottom surfaces 217, 213 of the tongue member 207, and in the apparatus 201 the center C' of the sphere corresponding to the spherical inner surface segment 237 is an offset distance OS below the tongue center line TC, while in the apparatus 101 the center C' of the sphere corresponding to the spherical inner surface segment 137 is on the center line of the tongue 107.

Also in the apparatus 201, the first and second slots 239A, 239B are offset from the center HC of the insert hole 235 toward the rear end 207R of the tongue member 207, and the bottom surface 253 of the ball insert member 241 is also offset such that same is farther from the center C of the sphere corresponding to the outer surface 243 of the ball insert member 241 than the top surface 255 of the ball insert member. The distance D1 between the center C of the sphere and the bottom surface 253 is greater than distance D2 between the center C of the sphere and the top surface 255.

Figure 10:
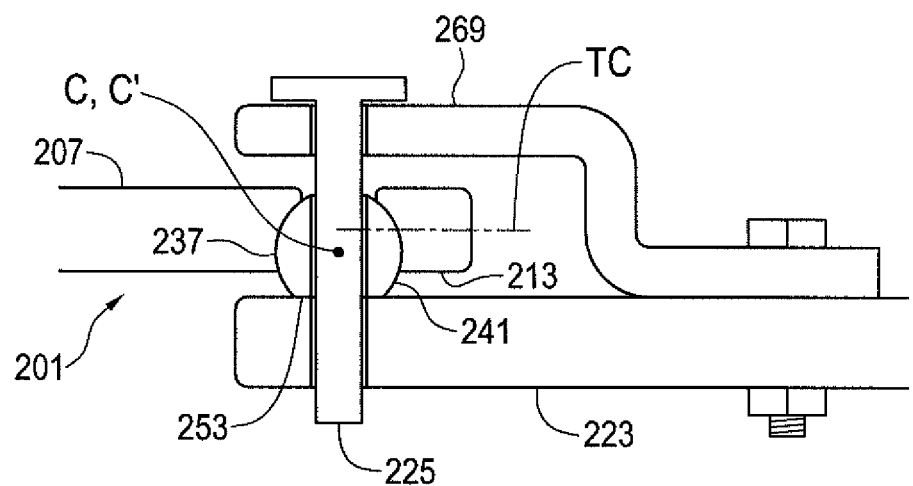
FIG. 10 is a schematic side view of the hitch tongue of FIG. 8 connected to a tractor drawbar.

This offset configuration of the spherical inner surface segment 237, the slots 239A, 239B, and the ball insert member 241 has the result that when the ball insert member 241 is inserted into the slots 239A, 239B and then rotated to orient the drawpin hole 209 vertically, the bottom surface 253 of the ball insert member 241 is below the bottom surface 213 of the tongue member 207. Thus when the hitch tongue apparatus 201 is connected to a tractor drawbar 223 with a drawpin 225 through the drawpin hole in the ball insert member 241, as schematically illustrated in FIG. 10, the bottom surface 253 of the ball insert member 241 bears against the top surface of the drawbar 223 and the bottom surface 213 of the tongue member 207 is supported above the drawbar.

During turns, friction between the bottom surface 253 of the ball insert member 241 and the top surface of the drawbar 223 will resist rotation of the ball insert member 241 with respect to the drawbar 223, and instead the ball insert member 241 will rotate in the insert hole 235 with respect to the tongue member 207 about a vertical axis substantially at the center of the drawpin hole 209. Thus instead of the bottom surface 213 of the tongue member 207 wearing against the top surface of the drawbar 223, any wear will take place between the ball insert member 241 and the spherical inner surface segment 237 of the insert hole 235.

Typically the hammer strap 269 forming the clevis for the hitch connection between the implement and tractor will be mounted on the tractor drawbar 223, where the drawpin 225 will bear against rear portions of the drawpin holes in the drawbar 223 and hammer strap 269, and the front portion of the drawpin hole in the ball insert member 241, During turns the drawpin 225, hammer strap 269, ball insert member 241 and drawbar 223 all remain stationary with respect to each other as the hitch tongue 207 rotates in the insert hole 235. Thus the number of wear areas is reduced.

To facilitate rotation of the ball insert member 241 in the spherical inner surface segment 237 of the insert hole 235, grease is provided between them. A grease conduit 257 is defined in the tongue member 207 and is connected at an input end thereof to a grease fitting 259 and has an output end 261 oriented to deposit grease at a grease location on the spherical inner surface segment 237 of the insert hole 235. To ensure the grease can access the whole of the surfaces, a grease groove 263 is defined along a circumference of the spherical inner surface segment 237 of the insert hole 235 coincidental with the grease location.

The grease fitting 259 is on a rear portion of the tongue member 207 and the grease conduit 257 is configured such that the output end 261 thereof is oriented to deposit grease at a location on a rear portion of the spherical inner surface segment 237 of the insert hole 235. To protect the grease fitting 259 from contact with objects when moving forward in operating travel direction T, the grease fitting 259 points rearward and is mounted rearward of a projection 265 extending laterally from the tongue member 207. The illustrated apparatus 201 shows a grease fitting 259 on each side of the tongue member 207 to ensure grease is present.

In the apparatus 201, the tongue member 207 is shown as an implement hitch tongue adapted at a rear end 207R thereof for attachment by bolts through holes 267 to an implement to be towed in an operating travel direction T. It is contemplated that the tongue member could also be a tractor drawbar with the ball insert member extending upward from the top surface of the drawbar so that an implement hitch tongue rests on the top surface of the ball insert member creating friction that resists relative movement, such that during turns the ball insert member rotates in the same manner as described above.

The one-piece offset ball insert member 241 and the offset spherical inner surface segment 237 of the insert hole 235 provide a simple, inexpensive improvement over the prior art devices. Different ball insert members 241 can be provided with the same outside configuration to fit in the insert hole 235 of a particular tongue member 207, and with different diameters of drawpin holes 209 to allow for easy changeover from one drawpin size to another if desired.

Thus the present invention reduces wear on hitch apparatuses.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A hitch tongue apparatus comprising:
   a tongue member defining an insert hole extending substantially vertically therethrough, the insert hole having a spherical inner surface segment between top and bottom surfaces of the tongue member that has a shape of a segment of a sphere;
   first and second slots, the slots extending along opposite edges of the insert hole from one of the top and bottom surfaces of the tongue member to a mid point of the spherical inner surface segment;
   a solid ball insert member defining a drawpin hole therethrough, and having a spherical outer surface configured to correspond to the spherical inner surface segment of the insert hole;
   wherein the ball insert member is removably installed in the insert hole by orienting the ball insert member such that top and bottom surfaces of the ball insert member are within the first and second slots, moving the ball insert member along the slots until a mid point of the ball insert member is substantially at the midpoint of the spherical inner surface segment of the insert hole, and then by rotating the ball insert member about 90 degrees such that the drawpin hole is substantially vertical when installed;
   wherein a tongue center line is located equidistant from top and bottom surfaces of the tongue member, and wherein a center of the sphere corresponding to the spherical inner surface segment of the insert hole is offset from the tongue center line in an offset direction toward one of the top and bottom surfaces;
   wherein the ball insert member is configured such that when inserted, an offset end thereof is farther from the center of the sphere than an opposite end surface of the ball insert member, and wherein the ball insert member and the spherical inner surface segment of the insert hole are configured such that the offset end of the ball insert member extends outward from one of the top and bottom surfaces, and such that the ball insert member rotates in the spherical inner surface segment of the insert hole.

2. The apparatus of claim 1 the solid ball insert member comprises first and second solid ball insert members, wherein the first ball insert member defines a first drawpin hole with a first diameter and the second ball insert member defines a second drawpin hole with a second diameter the larger than the first diameter; wherein the first and second solid ball insert members allow for easy changeover from the first solid ball insert member to the second solid ball insert member and vice versa.

3. The apparatus of claim 1 wherein at least an inner surface of the ball insert member has a Rockwell Scale hardness greater than a Rockwell Scale hardness of the inner surface of the insert hole.

4. The apparatus of claim 1 further comprising a drawpin inserted through the drawpin hole, and wherein at least the surface of the drawpin has a Rockwell Scale hardness less than a Rockwell Scale hardness of the inner surface of the insert hole.

5. The apparatus of claim 1 comprising a bottom recess defined in a bottom surface of the tongue member forward of the drawpin hole, and wherein the bottom recess is substantially filled by welding with a hard surfacing welding electrode.

6. The apparatus of claim 1 further comprising a grease conduit defined in the tongue member and connected at an input end thereof to a grease fitting and having an output end oriented to deposit grease at a location on the bottom surface of the tongue member and at a location on the spherical inner surface segment of the insert hole.

7. The apparatus of claim 1 wherein the first and second slots are offset from a center of the insert hole toward one of the front and rear ends of the tongue member.

8. The apparatus of claim 7 comprising a grease conduit defined in the tongue member and connected at an input end thereof to a grease fitting and having an output end oriented to deposit grease in at a grease location on the spherical inner surface segment of the insert hole.

9. The apparatus of claim 8 comprising a grease groove defined along a circumference of the spherical inner surface segment of the insert hole coincidental with the grease location.

10. The apparatus of claim 9 wherein the grease fitting points rearward and is mounted rearward of a projection extending laterally from the tongue member.

11. The apparatus of claim 8 wherein the grease fitting is on a rear portion of the tongue member and the grease conduit is configured such that the output end thereof is oriented to deposit grease at a location on a rear portion of the spherical inner surface segment of the insert hole.

12. The apparatus of claim 1 wherein the tongue member is an implement hitch tongue adapted at a rear end thereof for attachment to an implement to be towed in an operating travel direction, and wherein a tongue center line is located equidistant from top and bottom surfaces of the tongue member, and wherein a center of the sphere is below the tongue center line.

13. The apparatus of claim 1 wherein the first and second slots are offset from a center of the insert hole toward the rear end of the tongue member, and wherein the bottom surface of the ball insert member is farther from the center of the sphere than the top surface of the ball insert member, such that the bottom surface of the ball insert member is below the bottom surface of the tongue member, and wherein the tongue member and ball insert member are configured such that the ball insert member rotates with respect to the tongue member about a substantially vertical axis at a center of the drawpin hole.

14. The apparatus of claim 13 comprising a grease conduit defined in the tongue member and connected at an input end thereof to a grease fitting and having an output end oriented to deposit grease in a grease groove defined along a circumference of the spherical inner surface segment of the insert hole.

15. The apparatus of claim 14 wherein the grease fitting points rearward and is mounted rearward of a projection extending laterally from the tongue member on a rear portion of the tongue member and the grease conduit is configured such that the output end thereof is oriented to deposit grease in the grease groove at a rear portion of the spherical inner surface segment of the insert hole.

* * * * *